United States Patent
Blanc

(10) Patent No.: US 11,895,568 B2
(45) Date of Patent: Feb. 6, 2024

(54) SHORT DISTANCE WIRELESS COMMUNICATION MODULE AND ASSOCIATED WIRELESS COMMUNICATION METHOD

(71) Applicant: Faurecia Clarion Electronics Europe, Paris (FR)

(72) Inventor: Guillaume Blanc, Massy (FR)

(73) Assignee: Faurecia Clarion Electronics Europe, Paris (FR)

( * ) Notice: Subject to any disclaimer, the term of this patent is extended or adjusted under 35 U.S.C. 154(b) by 227 days.

(21) Appl. No.: 17/385,281

(22) Filed: Jul. 26, 2021

(65) Prior Publication Data
US 2022/0030405 A1    Jan. 27, 2022

(30) Foreign Application Priority Data

Jul. 24, 2020   (FR) .................................... 20 07805

(51) Int. Cl.
| | |
|---|---|
| *H04W 40/02* | (2009.01) |
| *H04W 4/80* | (2018.01) |
| *H04W 76/10* | (2018.01) |
| *H04L 1/00* | (2006.01) |
| *H04L 69/22* | (2022.01) |

(52) U.S. Cl.
CPC .............. *H04W 4/80* (2018.02); *H04L 1/004* (2013.01); *H04L 69/22* (2013.01); *H04W 76/10* (2018.02)

(58) Field of Classification Search
CPC ....... H04W 4/80; H04W 76/10; H04W 84/18; H04W 88/08; H04W 40/248; H04W 76/14
See application file for complete search history.

(56) References Cited

U.S. PATENT DOCUMENTS

| | | | | |
|---|---|---|---|---|
| 10,866,917 | B2* | 12/2020 | Sagalovitch | ............ G06F 13/20 |
| 2013/0170451 | A1* | 7/2013 | Krause | ................ H04W 72/542 |
| | | | | 370/329 |
| 2014/0092806 | A1* | 4/2014 | Kidron | .................... G06F 13/12 |
| | | | | 370/328 |
| 2017/0272270 | A1* | 9/2017 | Gu | ........................ H04B 17/318 |

OTHER PUBLICATIONS

French Search Report corresponding to French Application No. FR 2007805, dated May 15, 2021, 2 pages.

* cited by examiner

*Primary Examiner* — Lan-Huong Truong
(74) *Attorney, Agent, or Firm* — Reising Ethington P.C.

(57) ABSTRACT

A short-distance wireless communication module according to the Bluetooth standard, able to communicate data packets between at least one client and at least one remote device. The communication module includes a processor configured to execute at least two high-level software components for implementing a communication protocol, which are distinct and independent, and a hardware component connected to a communication antenna. The antenna is capable of communicating with the at least one remote device according to the Bluetooth standard. This module has an intermediate software component, connected between the at least two high-level software components and the hardware component, which includes a decoder module and a routing module, configured to route a received data packet to a recipient according to stored routing information and according to information obtained from the decoder module.

15 Claims, 5 Drawing Sheets

SHORT DISTANCE WIRELESS COMMUNICATION MODULE AND ASSOCIATED WIRELESS COMMUNICATION METHOD

TECHNICAL FIELD

The present invention relates to a short-distance wireless communication module, in particular according to the Bluetooth standard, and an associated short-distance wireless communication method.

The invention is in the field of short-distance wireless communication, in particular in the field of Bluetooth wireless communication technology.

BACKGROUND

The Bluetooth communication standard is a short-distance wireless communication standard, or short range, allowing the bidirectional exchange of data and using UHF ("Ultra High Frequency") wireless waves on a 2.4 GHz frequency band. The Bluetooth standard has a range of about 10 to 15 meters, and can go up to 60 meters.

The use of the Bluetooth wireless communication standard is widespread, between various devices, for example computers, tablets, speakers, cell phones, "hands-free" systems for microphones or headphones, car wireless etc., the list being of course not exhaustive.

To enable the use of the Bluetooth communication standard, each compatible device, known as a "Bluetooth device", has, in a conventional manner, a processor that implements a software component for the implementation of the communication protocol defined by the Bluetooth standard, also known as the "stack" in technical terminology, and a hardware component, also known as the Bluetooth controller, connected to a communication antenna for the transmission and reception of wireless packets. In other words, the software component is in charge of the high-level communication protocol functionalities, for interfacing with a client application of the device, and the hardware component is in charge of the low-level communication protocol functionalities, associated with layers 1 and 2 of the OSI model (for "Open Systems Interconnection"). In a known way, such a "Bluetooth device" is capable of connecting to one or several other remote Bluetooth devices, for example telephone, headset, hands-free kit, etc.

For some applications, for example for the development of management platforms for several client devices, it is necessary to implement, from a hardware platform, a Bluetooth communication between several distinct client applications and several remote Bluetooth devices.

In conventional Bluetooth technology, developed by the Bluetooth Special Interest Group (SIG), data packets, comprising useful data (e.g. payload) or commands/controls, formatted according to the HCl (Host Controller Interface) format, are transported over a bi-directional link between a hardware component (or "Bluetooth controller") and a software component ("stack") as described above.

According to the Bluetooth standard, the implementation of several distinct software components, associated with distinct devices or distinct operating system instances, requires the use of as many hardware components, and as many associated antennas.

However, the multiplication of hardware components induces an increase in size, manufacturing costs and electrical power consumption during operation.

US2014/0092806 A1 describes a Bluetooth communication module arrangement wherein the hardware component, which is the wireless microcontroller, is modified to support a plurality of interfaces with separate host devices. This document describes the use of a selector module in a wireless microcontroller. However, the solution proposed in this document involves modifying the programming code at the microcontroller.

SUMMARY

An object of the invention is to overcome the disadvantages of the prior art by providing a solution for the implementation of several distinct client applications, each associated with a distinct communication protocol implementation software component that is simpler to implement and more flexible.

To this end, according to one aspect, the invention proposes a Bluetooth standard short-distance wireless communication module, capable of communicating data packets between at least one client and at least one remote device, the said communication module comprising a processor configured to execute at least two distinct and independent high-level communication protocol implementation software components, each of the said high-level software components being associated with a distinct client, and a hardware component connected to a communication antenna, the said antenna being able to communicate with the said at least one remote device according to the Bluetooth standard. This module comprises an intermediate software component, connected between the said at least two distinct high-level software components and the said hardware component. The intermediate software component comprises a decoder module configured to decode data packets, formatted according to the said communication protocol, and a routing module configured to dynamically update stored routing information depending on information obtained from the decoder module and to route a received data packet to a recipient depending on the said stored routing information and depending on the said information obtained from the decoder module, the said recipient being either one of the said high-level software components, or a recipient remote device.

Advantageously, the communication module comprises an intermediate software component, connected between the said at least two distinct communication protocol implementation software components and the said hardware component. Advantageously, due to the implementation of the intermediate software component, the communication protocol implementation software components and the hardware component are unchanged.

The communication module according to the invention may also include one or more of the following features, taken independently or in any technically conceivable combination.

The stored routing information comprises a first routing information associating a recipient remote device address with a high-level software component identifier, and a second routing information associating a connection identifier and a recipient remote device address.

Upon receipt of a data packet from the hardware component, the decoder module is configured to extract a connection identifier and the routing module is configured to identify a destination high-level software component from the said connection identifier, using the said stored first and second routing information together.

The decoder module is configured to extract data packet type information.

When the data packet is a command packet containing a connection command from a high-level software component, the decoder module is capable of extracting a recipient device address, and to add a link between the said recipient device address and an identifier of the originating high-level software component in the first routing information.

The module further comprises a data packet generator module, configured to generate at least one further data packet formatted according to the communication protocol.

The further generated data packet comprises error or malfunction information.

According to another aspect, the invention relates to a method of short-distance wireless communication according to the Bluetooth standard, implemented by an intermediate software module, itself implemented by a processor of a wireless communication module as briefly described above, the intermediate software module being connected between at least two separate and independent high-level software components implementing a communication protocol and a hardware component. The method comprising the steps, upon receipt of a data packet formed according to the communication protocol, of:

decoding at least a portion of the data packet,
dynamically updating stored routing information based on information obtained by decoding, and
routing the received data packet to a recipient based on the said stored routing information and based on the said decoded information, the said recipient being either one of the said high-level software components or a remote recipient device.

The communication method according to the invention may also include one or more of the following features, taken independently or in any technically conceivable combination.

The method comprises, following reception of a data packet from one of the said high-level software components, identification of the high-level software component from which it originates, decoding of at least part of the data packet to obtain packet type information and, depending on the type of packet, a connection identifier or a recipient device address.

It comprises a determination step of determining whether the packet comprises payload data, and, in the event of a positive determination, transmitting the said packet to the hardware component.

The method comprises, in case of a negative determination, proper processing of the data packet based on the information obtained from the decoding and the stored routing information, the proper processing comprising: ignoring the said data packet, or transmitting the data packet to at least one recipient or modifying the data packet and transmitting it to at least one recipient or generating another data packet and transmitting the said at least one other data packet to at least one recipient.

The method further comprises determining whether the packet comprises a command to modify the stored routing information, and if determined to be positive, modifying the stored routing information.

The method comprises, following a reception of a data packet from the hardware component, a decoding of at least a part of the data packet to obtain a packet type information and, depending on the packet type, a connection identifier.

The method comprises a determination step of determining whether the packet comprises payload data, and, in case of a positive determination, obtaining an identifier of a recipient high-level software component based on the connection identifier and using the said stored first and second routing information together.

According to another aspect, the invention relates to a computer program comprising software instructions which, when implemented by a programmable electronic device, implements a standard short-distance wireless communication method, according to the Bluetooth standard as briefly described above.

BRIEF DESCRIPTION OF THE DRAWINGS

Further characteristics and advantages of the invention will be apparent from the description given below, provided solely as a non-limiting example, and with reference to the appended drawing.

DETAILED DESCRIPTION

Figure 1:
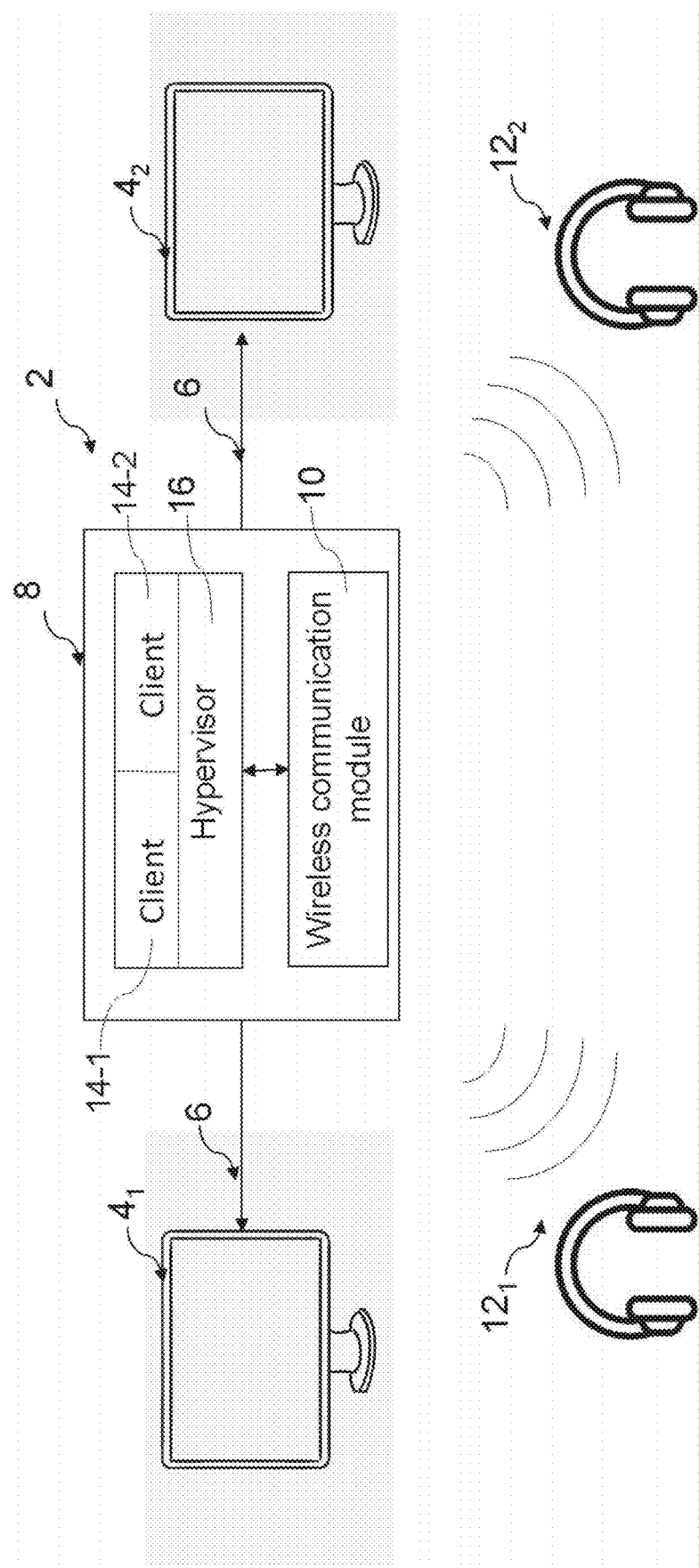
FIG. 1 is an example of a system in which the invention may be applied.

FIG. 1 illustrates a non-limiting example of an application of the invention, in an onboard entertainment system 2 in a vehicle, for example a motor vehicle (not shown).

For example, such an entertainment system is located in a motor vehicle containing a passenger compartment in which seats are positioned, organized in rows, comprising a so-called front row, located at the front of the vehicle in the direction of travel, and one or more so-called rear rows.

For example, an onboard entertainment system 2 is dedicated to broadcasting multimedia content for passengers located in a rear row of the vehicle.

The system 2 comprises two screens $4_1$, $4_2$ respectively a left screen and a right screen, for example intended for viewing video content, for example positioned on the backrests of the seats of the previous row. Each screen 4 is connected, for example via a wired link 6, to a device 8 for supplying multimedia content. This device 8 is for example a box integrating hardware and software elements for the implementation of multimedia content storage functionalities, multimedia content decoding, multimedia content display as well as communication interfaces with remote devices, e.g. headsets, headphones, and operator command input interfaces.

In particular, the device 8 comprises a short-distance wireless communication module 10, according to the Bluetooth standard, capable of communicating data packets with remote devices noted $12_1$, $12_2$ in the example. In the example, the remote devices $12_1$, $12_2$ are audio headsets, used by the passengers, each audio headset $12_i$ being able to receive audio data packets related to the multimedia content displayed on the corresponding screen $4_i$. By short distance is meant here a range of less than 60 meters, generally of the order of 10 to 15 meters.

Alternatively or additionally, the entertainment system 2 comprises other remote devices 12, for example cell phones, remote controls, able to communicate, by short-distance wireless link according to the Bluetooth standard, with the device 8 for providing multimedia content.

From a functional point of view, the system 2 is configured to provide multimedia contents to be displayed by each of the screens $4_1$, $4_2$ independently, according to respectively received commands. For example, in the case of providing videos, video streams are displayed, independently from each other, on each of the screens $4_1$, $4_2$, and corresponding audio streams, independent from each other, are transmitted to the Bluetooth devices $12_1$, $12_2$.

The device 8 implements a client $14_1$ capable of executing applications (or services) in connection with the display of the multimedia contents on the screen $4_1$. In one embodiment, the client $14_1$ is an instance of an operating system, for example the Android® operating system.

Similarly, the device 8 implements a client $14_2$ able to execute applications (or services) in connection with the displays of the multimedia contents on the screen $4_2$. In one embodiment, the client $14_2$ is an instance of an operating system, for example the Android® operating system.

In the illustrated embodiment, the clients $14_1$ and $14_2$, are implemented by virtual machines through the use of a hypervisor 16, used to share hardware resources, for example the computing processor and electronic memory units, of the device 8 between the two operating system instances $14_1$, $14_2$.

Figure 2:
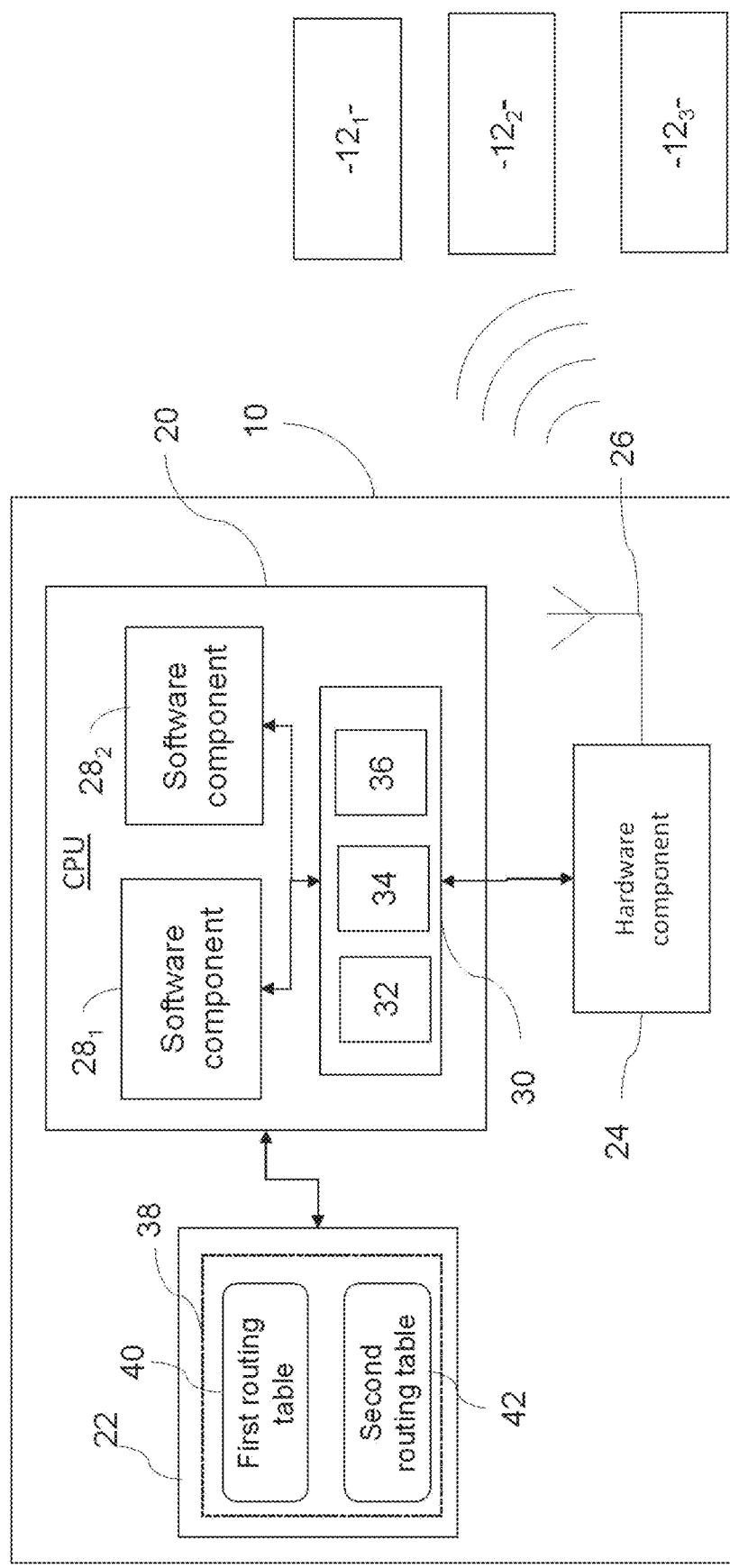
FIG. 2 is a block diagram of a device comprising a wireless communication module according to an embodiment.

FIG. 2 illustrates an embodiment of the main hardware elements of a wireless communication module 10, able to perform wireless communication of data packets between two clients and several remote devices $12_1$, $12_2$, $12_3$.

The wireless communication module 10 is capable of communicating according to a short-distance wireless communication protocol, e.g., Bluetooth. The remote devices $12_1$, $12_2$, $12_3$ are also Bluetooth devices.

The communication module 10 comprises a computing processor 20 and an electronic memory unit 22.

In an embodiment in which the communication module is integrated with a device, such as the multimedia content delivery device 8 of FIG. 1, the hardware elements that are the computing processor 20 and the electronic memory unit 22 may be shared with the device 8.

The communication module 10 further comprises a hardware component 24, which is a Bluetooth controller, connected to an antenna 26.

The hardware component 24 is, for example, implemented as an integrated circuit. The hardware component 24 is responsible for low-level communication protocol functionality according to the Bluetooth standard.

The computing processor 20 of the communication module 10 implements a first software component $28_1$ for implementing the communication protocol, associated with a first client, and a second software component $28_2$ for implementing the communication protocol, associated with a second client.

The first software component $28_1$ and the second software component $28_2$ are distinct and independent. In other words, these software components do not communicate with each other.

Each software component $28_1$, $28_2$, referred to as a high-level software component, implements high-level communication features of the Bluetooth communication protocol. These two software components are, for example, implemented by known protocol stack implementations. These two software components could be provided by different manufactures of software, for example, one as Android software component, and another as Microsoft software component.

In addition, the computing processor 20 of the communication module 10 implements an intermediate software component 30, connected between the separate high-level software components $28_1$, $28_2$ and the controller 24. The implementation of the separate high-level software components $28_1$, $28_2$ is not altered by the presence of the intermediate software component, or in other words, each high-level software component is implemented to communicate with a hardware component.

Each high-level software component $28_1$, $28_2$ is connected via a bidirectional link to the intermediate software component 30.

In addition, the intermediate software component 30 is connected via a serial link, for example of the UART ("Universal Asynchronous Receiver Transceiver") type, to the controller 24.

Advantageously, thanks to the intermediate software component 30, described in more detail below, the controller 24 is able to communicate data packets between several distinct and independent high-level software components $28_1$, $28_2$ and the remote devices $12_1$, $12_2$, $12_3$.

The number of high-level software components is equal to two in this example, but any number greater than two such separate high-level software components is conceivable.

Data packets transmitted and received via the intermediate software component 30 are formatted in the HCI format.

The intermediate software component 30 comprises a decoder module 32, a data packet generator module 34, and a routing module 36. The intermediate software component 30 uses and dynamically updates routing information 38, stored for example in the electronic memory unit 22.

In one embodiment, the routing information comprises a first routing information 40 that associates Bluetooth device addresses with high-level software component identifiers, and a second routing information 42 that associates connection identifiers with Bluetooth device addresses.

In one embodiment the first routing information 40 is a first routing table, and the second routing information 42 is a second routing table.

More generally, any computer structure for storing associations between Bluetooth device addresses and high-level software component identifiers on the one hand, and between connection identifiers and Bluetooth device addresses on the other hand, can be used.

The use of the routing information will be described in more detail below.

In one embodiment, the intermediate software component 30 is a computer program formed by the modules 32, 34, 36, implemented as software instructions. This computer program, when executed by a programmable electronic device, implements a short-distance wireless communication method according to the Bluetooth standard.

In a variant, not shown, the modules 32, 34, 36 are each realized in the form of a programmable logic component, such as an FPGA (Field Programmable Gate Array), a GPU (Graphics Processing Unit) or a GPGPU (General-Purpose Graphics Processing Unit), or in the form of a dedicated integrated circuit, such as an ASIC (Application Specific Integrated Circuit).

The computer program comprising software instructions is further capable of being stored on a computer-readable medium, not shown. The computer-readable medium is, for example, a medium capable of storing the electronic instructions and of being coupled to a bus of a computer system. As an example, the readable medium is an optical disk, a magneto-optical disk, a ROM, a RAM, any type of non-volatile memory (e.g. EPROM, EEPROM, FLASH, NVRAM), a magnetic card or an optical card.

The Bluetooth standard defines a packet formatting, called HCl ("Host Controller Interface").

The HCl format mainly defines 4 types of packets which are the following:
- ACL ("Asynchronous Connection Less") packets, which carry payload data;
- SCO ("Synchronous Connection Oriented") packets, which carry audio data;
- Command packets, sent by a high-level software component to the hardware component;
- Events packets, sent by the hardware component to the high-level software component.

HCl formatted packets will be referred to as HCl packets hereafter.

ACL packets and SCO packets contain, in addition to the payload data, a connection identifier called "connection handle".

The connection handle, defined in the Bluetooth standard, identifies a communication link between the Bluetooth controller and a remote Bluetooth recipient device. For example, the connection handle is a connection number.

The processing of HCl packets by the intermediate software component differs, according to the type of packets. The decoder module 32 is capable of extracting information from the HCl packets, in particular the HCl packet type, and the connection identifier.

The intermediate software component 30 is also able to determine the communication direction of the packets, namely from one of the high-level software components to the hardware component or vice versa, from the hardware component to a high-level software component.

The router module 36 dynamically updates the routing information 38, which in one embodiment comprises a first routing table 40 and a second routing table 42, and uses the information transmitted by the decoder module 32 and the routing information to route the packets to an identified recipient.

The term "recipient" here refers to either a remote device or a high-level software component.

In particular, ACL and SCO packets comprising payload data are routed to a recipient.

Command packets and event packets are ignored, routed or modified depending on the command or event, the information decoded by the decoding module and the stored routing information.

The packet generator module 34 analyzes information obtained by the decoder module 32 and generates HCl packets for transmitting configuration commands or error messages.

Figure 3:
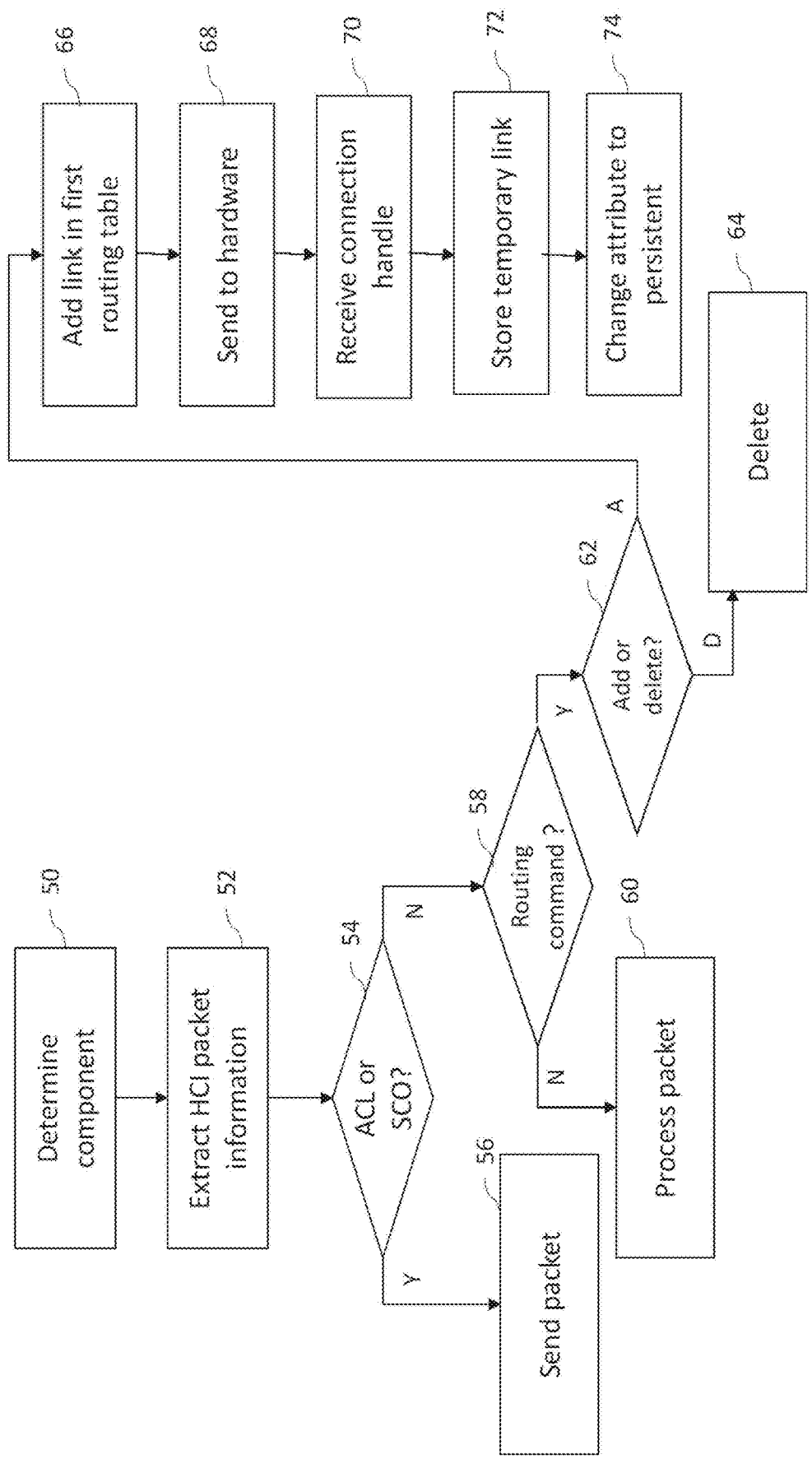
FIG. 3 is a flow chart of the main steps of an embodiment of a wireless communication method, according to a first direction of data packet communication.

FIG. 3 is a synopsis of the steps of a wireless communication process implemented by an intermediate software component 30 according to an embodiment, when receiving HCl data packets sequentially via serial communication links, from two high-level software components, a first high-level software component identified by "Comp_1" in this example, a second high-level software component identified by "Comp_2" in this example.

The received HCl packets are processed sequentially.

For a processed HCl packet, the method comprises a step 50 of determining the high-level software component of origin and a step 52 of decoding a portion of the HCl packet to extract HCl packet type information, and, if applicable, a connection identifier.

It is then determined at determination step 54 whether the received HCl packet is an ACL or SCO packet, and if determined to be positive, the packet, at sending step 56 is sent to the hardware component. The hardware component processes this unmodified HCl packet according to the Bluetooth communication protocol to deliver it to a remote recipient device.

In case of a negative determination in step 54, it is checked in step 58 whether the HCl packet is a command packet comprising a command such as to modify the stored routing information. In particular, it is checked whether the command is a connection creation command, e.g. "CreateConnection" command, or whether the command is a pairing deletion command between a high-level software component and a remote device, e.g. "DeleteStoredLinkKey".

If the HCl packet does not comprise a command of such a nature as to change the routing information, processing of the packet is performed in the proper processing step 60.

The proper processing 60 is performed depending on the command. For example, the packet may be ignored or modified before being forwarded, depending on the command, so as not to disrupt data packet communication. Indeed, the hardware component is not modified and thus operates as if it were communicating with a single protocol stack, or, in other words, a single protocol-implementing software component.

The proper processing is done on a case-by-case basis depending on the command, as well as, if applicable, stored routing information and/or packets containing events received from the hardware component.

If the HCl packet is a command packet of a nature to modify the routing information, step 58 is followed by a step 62 to determine whether the modification is an addition or deletion of routing information.

In the case of deletion, for example if the command is a "DeleteStoredLinkKey" command, a link deletion is performed, in the deletion step 64, in the first routing table that links the recipient device addresses to the high-level software component identifiers ("Comp_1" or "Comp_2" in the example).

If added, step 62 is followed by a step 66 of adding, in the first routing table, a link between the high-level software component from which the processed packet originates and the network address, formatted according to the Bluetooth standard, of the recipient device. A "temporary" attribute is assigned to this link. The "temporary" attribute refers to the fact that the association between the high-level software component and the remote device persists only until the end of the connection.

Figure 4:
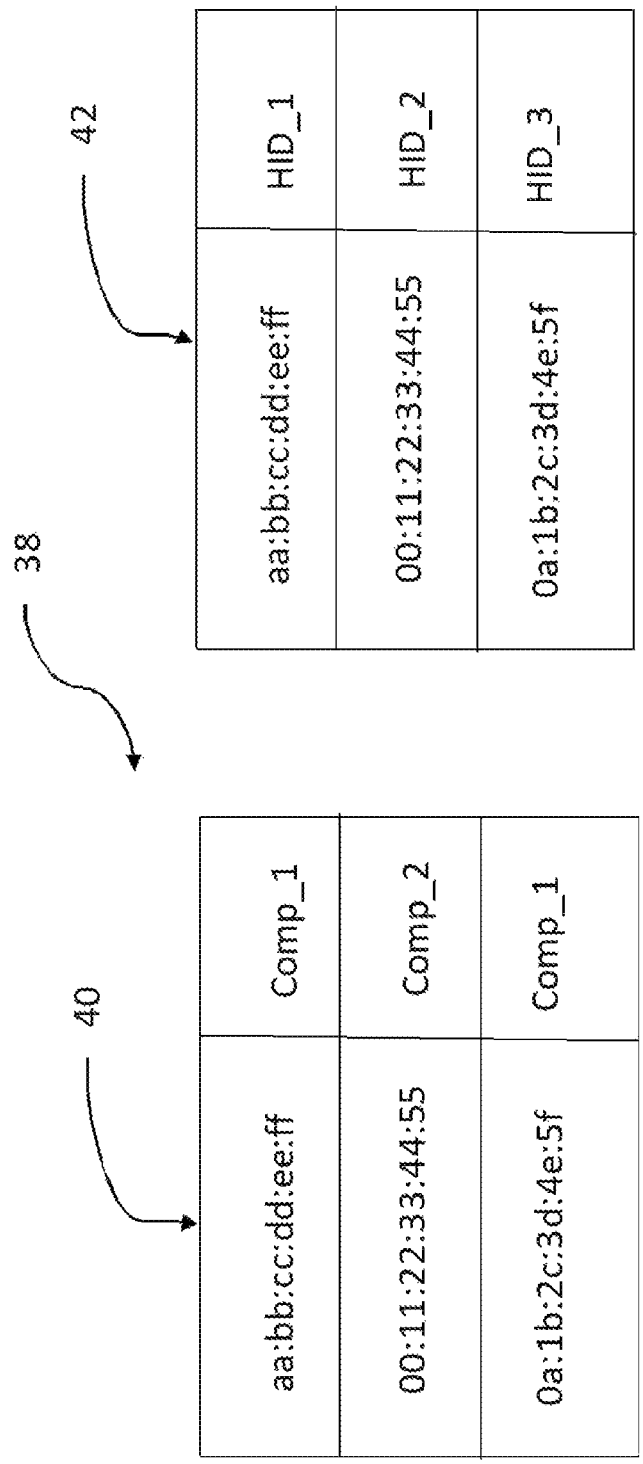
FIG. 4 is a schematic example of stored routing information.

FIG. 4 illustrates a schematic example of routing information 38 comprising a first routing table 40 and a second routing table 42.

Of course, although illustrated in table form, the routing information may be stored in any suitable data structure.

As an example, if the processed HCl packet originates from the high-level software component "Comp_1", and the recipient address extracted from the packet is "0a:1b:2c:3d:4e:5f", a row storing the link between "0a:1b:2c:3d:4e:5f" and "Comp1" is added to the table 40. The identifier "Comp_1" is for example a number or a string.

The command packet comprising the connection command is sent to the hardware component in step 68, and in return, a connection handle, for example HID_3, is received from the hardware component in receiving step 70, and this temporary link is stored in storing step 72 in the second routing table 42.

As an example, the association between the connection identifier HID_3 and the receiving device address "0a:1b:2c:3d:4e:5f" is stored in the second table 42.

In a subsequent step 74, following a successful authentication confirmation received from the hardware component, the "temporary" attribute of the temporary link stored in step 72 is changed to "persistent". A "persistent" association is one that persists after a system logout and reboot.

A "successful authentication" occurs when the remote device is "paired". Pairing is a procedure specified by the Bluetooth standard that allows two devices to be permanently associated with each other so that they can easily and securely connect.

If the connection is a simple service discovery, step 74 will not take place and the temporary link will be removed upon disconnection.

Steps 56, 60, 64, 74 are followed by a return to step 50 for processing a subsequent HCI packet.

Figure 5:
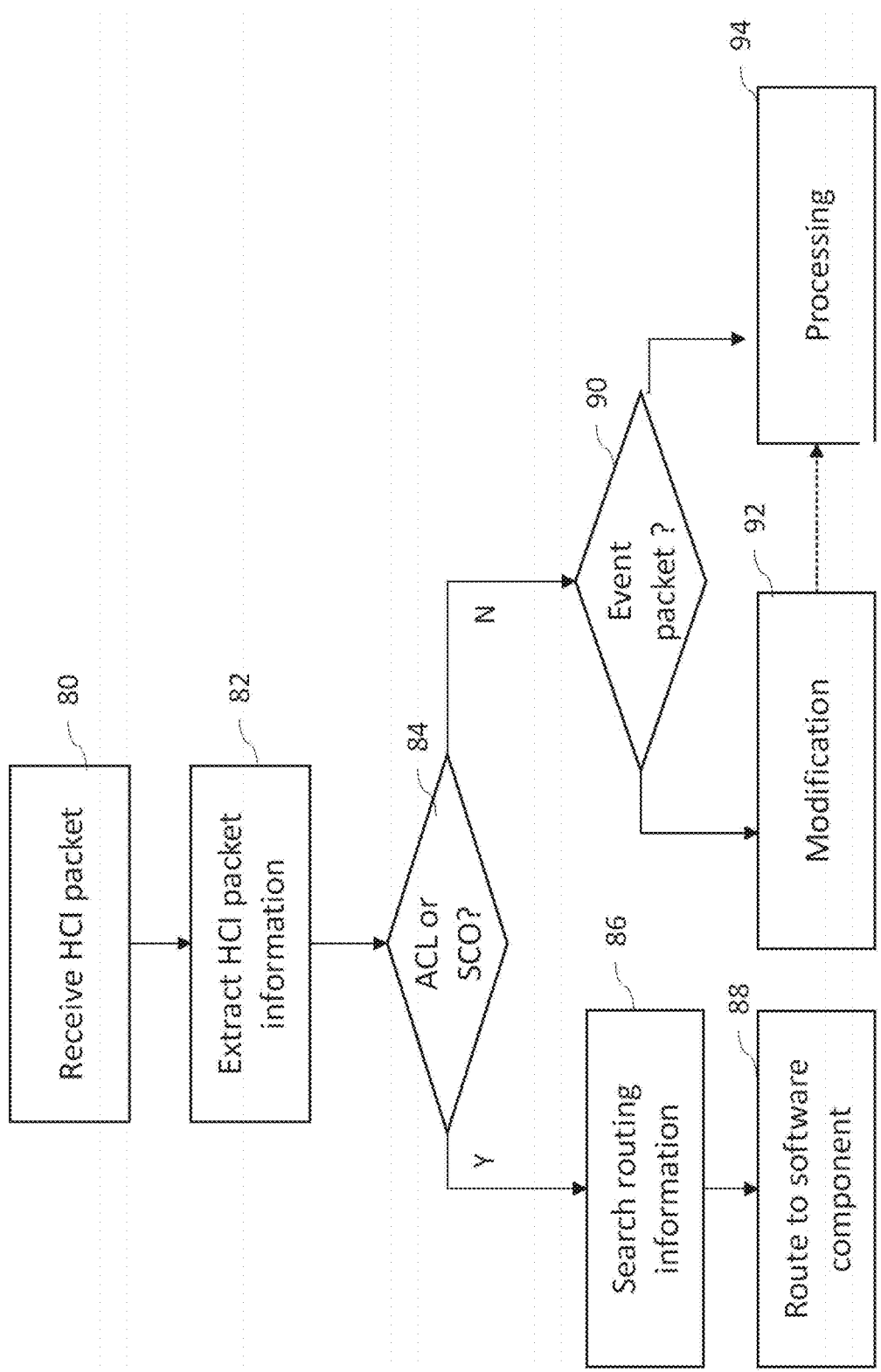
FIG. 5 is a flow chart of the main steps of an embodiment of a wireless communication method, according to a second data packet communication direction.

FIG. 5 is a synopsis of the steps of a wireless communication method implemented by an intermediate software component 30 according to one embodiment, when receiving HCI packets from the hardware component (or "controller").

The method comprises a step 80 of receiving an HCI packet from the hardware component, followed by a step 82 of decoding a portion of the HCI packet to extract an HCI packet type information, and, if applicable, a connection identifier.

It is then determined, in the determination step 84, whether the received HCI packet is an ACL or SCO packet.

If the determination is positive, step 84 is followed by a step 86 of searching the stored routing information for the high-level software component recipient identifier depending on the connection identifier obtained in step 82 of decoding. In one embodiment, step 86 involves retrieving the stored Bluetooth address related to the connection identifier from the second routing table 42, and then retrieving the high-level software component identifier associated with the obtained Bluetooth address from the first routing table 40.

Following the obtaining of the high-level software component identifier, step 86 is followed by a step 88 of routing the ACL or SCO packet to the identified high-level software component, through the bidirectional serial data link with this high-level software component.

As an example, with reference to FIG. 4, if the connection identifier extracted from the packet is HID_2, the address "00:11:22:33:44:55" is extracted from the second table 42, and the high-level software component identifier "Comp_2", associated with the address "00:11:22:33:44:55" is extracted from the first table 40. The ACL or SCO data packet is transmitted to the high-level software component "Comp_2" in this example.

If the determination of step 84 is negative, step 84 is followed by a step 90 consisting of determining whether the HCI packet is an "event" packet comprising information likely to modify the stored routing information. In particular, as an example, it is checked whether the packet contains one of the following events:

AuthenticationComplete which induces a modification of the "temporary" attribute to "persistent" for a link recorded in the routing information;

ConnectionComplete or SynchronousConnectionComplete which induces an entry addition to link a Bluetooth address and a connection identifier in the second routing table;

DisconnectionComplete which induces a deletion of temporary links stored in the routing tables;

RemoteNameRequestComplete which induces a deletion of a temporary link entry in the second routing table.

If the event is such as to induce a modification in the routing information, step 90 is followed by a modification step 92.

The modification step 92 consists of adding a link in a routing table, changing a link attribute from "temporary" to "persistent" or deleting a routing table link.

If there is a negative response in step 90, or after step 92, if applicable, proper processing 94 of the packet is performed.

For example, the proper processing comprises transmission of the packet to a high-level software component recipient, determined by a search of the stored routing information for the high-level software component recipient identifier, similar to step 86 described above.

The proper processing comprises, for certain events, transmitting to all high-level software components, for example, events reporting errors or malfunctions such as HardwareError or DataBufferOverflow.

The proper processing comprises, for certain events, the generation by the generator module of one or more HCI packets, formatted according to the Bluetooth standard specifications, to signal a connection error for example. For example, when a connection is established, for example between the first high-level software component and a recipient device, the routing information is stored with a "persistent" link attribute in the routing tables. If later, the second high-level software component requires, via an HCI packet containing a command, a connection with the same recipient device, with the same Bluetooth address, a connection failure message is generated by the generator module and then sent to the second high-level software component.

Advantageously, the invention allows communication with several remote devices in a seamless manner. When a given remote device is associated to a high-level software component (e.g. protocol stack), the other high-level software components are not aware of the given remote device. In other words, the given remote device is "unseen" by the other high-level software components.

The invention claimed is:

1. A short distance wireless communication module communicating data packets between at least one client and at least one remote device, the communication module comprising a processor configured to execute at least two separate high-level software components for implementing a communication protocol, each of the high-level software components being associated with a separate client, and a hardware component connected to a communication antenna, the antenna being able to communicate with the at least one remote device according to a Bluetooth standard, further comprising an intermediate software component, connected between the at least two high-level software components and the hardware component, the intermediate software component comprising a decoder module decoding data packets formatted according to the communication protocol, and a routing module dynamically updating stored routing information based on information obtained from the decoding module and routing a received data packet to a recipient based on the stored routing information and based on the information obtained from the decoding module, the recipient being either one of the high-level software components or a remote recipient device.

2. The communication module according to claim 1, wherein the stored routing information comprises a first routing information associating a remote recipient device address with a high-level software component identifier, and a second routing information associating a connection identifier and a remote recipient device address.

3. The communication module according to claim 2, wherein, upon receipt of a data packet from the hardware component, the decoder module extracts a connection identifier and the routing module identifies a recipient high-level software component from the connection identifier, using the first and second stored routing information together.

4. The communication module according to claim 1, wherein the decoder module extracts data packet type information.

5. The communication module according to claim 4, wherein, when the data packet is a command packet containing a connection command from an originating high-level software component, the decoder module extracts a recipient device address and adds a link between the recipient device address and an identifier of the originating high-level software component in the first routing information.

6. The communication module according to claim 1, further comprising a data packet generator module which generates at least one further data packet formatted according to the communication protocol.

7. The module according to claim 6, wherein the further generated data packet comprises error or malfunction information.

8. A method of short-distance wireless communication implemented by an intermediate software module, the intermediate software module being executable by a processor of a short distance wireless communication module communicating data packets between at least one client and at least one remote device, the communication module comprising a processor configured to execute at least two separate high-level software components for implementing a communication protocol, each of the high-level software components being associated with a separate client, and a hardware component connected to a communication antenna, the antenna being able to communicate with the at least one remote device according to a Bluetooth standard, further comprising an intermediate software component, connected between the at least two high-level software components and the hardware component;
the method comprising, following the reception of a data packet formatted according to the communication protocol:
decoding of at least a portion of the data packet,
dynamically updating stored routing information as a function of information obtained by decoding, and
routing of the received data packet to a recipient depending on the said stored routing information and based on the said decoded information, the recipient being either one of the high-level software components or the remote recipient device.

9. The method according to claim 8, comprising, following receipt of a data packet from an originating one of the high-level software components, obtaining an identifier from the originating high-level software component, decoding at least a portion of the data packet to obtain packet type information and, depending on the packet type, extracting a connection identifier or a recipient device address.

10. The method according to claim 9, comprising determining whether the packet comprises payload data, and, if the packet comprises payload data, transmitting the packet to the hardware component.

11. The method according to claim 10, comprising, in the event of a negative determination, a proper processing of the data packet depending on the information obtained from the decoding and the stored routing information, the proper processing comprising: ignoring the data packet, or transmitting the data packet to at least one recipient or modifying the data packet and transmitting it to at least one recipient or generating another data packet and transmitting the at least one other data packet to at least one recipient.

12. The method according to claim 8, further comprising determining whether the packet comprises a command to modify the stored routing information, and when the packet comprises a command to modify the stored routing information, modifying the stored routing information.

13. The method according to claim 8, comprising, following receipt of a data packet coming from the hardware component, decoding at least a portion of the data packet to obtain packet type information and, depending on the packet type, extracting a connection identifier.

14. The method according to claim 13, comprising determining whether the packet comprises payload data, and, if the packet comprises payload data, obtaining an identifier of a high-level software component recipient depending on the connection identifier and using the stored first and second routing information in conjunction.

15. A non-transitory computer-readable medium having stored thereon a computer program comprising software instructions that, when implemented by a programmable electronic device, implement a wireless communication method according to claim 8.

* * * * *